(12) United States Patent
Sievers et al.

(10) Patent No.: US 9,939,601 B2
(45) Date of Patent: Apr. 10, 2018

(54) ANCHORING CABLES TO RACK WITH SELF-LOCKING CABLE CLAMP ARRANGEMENTS

(71) Applicant: CommScope Technologies LLC, Hickory, NC (US)

(72) Inventors: Scott C. Sievers, Jordan, MN (US); Christopher Sluis, Andover, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/072,641

(22) Filed: Mar. 17, 2016

(65) Prior Publication Data

US 2016/0266344 A1 Sep. 15, 2016

Related U.S. Application Data

(63) Continuation of application No. 14/199,410, filed on Mar. 6, 2014, now Pat. No. 9,291,791.

(60) Provisional application No. 61/779,659, filed on Mar. 13, 2013.

(51) Int. Cl.
| | |
|---|---|
| *G02B 6/00* | (2006.01) |
| *G02B 6/44* | (2006.01) |
| *G02B 6/46* | (2006.01) |

(52) U.S. Cl.
CPC ......... *G02B 6/4471* (2013.01); *G02B 6/4452* (2013.01); *G02B 6/46* (2013.01); *Y10T 29/49817* (2015.01); *Y10T 29/49947* (2015.01)

(58) Field of Classification Search
None
See application file for complete search history.

(56) References Cited

U.S. PATENT DOCUMENTS

| 2,318,853 A | 5/1943 | Hall |
| 3,061,253 A | 10/1962 | Keaton |
| (Continued) | | |

FOREIGN PATENT DOCUMENTS

| JP | 3-296298 | 12/1991 |
| JP | 11-346072 | 12/1999 |
| (Continued) | | |

OTHER PUBLICATIONS

International Search Report and Written Opinion for PCT/US2013/067780 dated Feb. 17, 2014.
(Continued)

*Primary Examiner* — Sung Pak
(74) *Attorney, Agent, or Firm* — Merchant & Gould P.C.

(57) ABSTRACT

A self-locking cable clamp arrangement includes a bracket and a flexible tab disposed on the bracket. The bracket has a cable mounting region, a first engagement region, and a support region disposed therebetween. A cable can be clamped to the cable mounting region. The support region defining two members spaced apart sufficient to enable an edge of the panel to extend partially therebetween. The flexible tab can be selectively coupled to the cable mounting region and to the first engagement region. The clamp arrangement mounts to the panel by sliding the bracket downwardly through an open-ended slot defined in the panel until the tab is received within a cutout portion of the panel to secure the bracket to the panel.

5 Claims, 16 Drawing Sheets

(56) References Cited

U.S. PATENT DOCUMENTS

| | | | |
|---|---|---|---|
| 3,802,654 A * | 4/1974 | Jenko | H02G 3/065 174/72 A |
| 4,119,285 A * | 10/1978 | Bisping | F16L 3/13 248/222.12 |
| 4,561,153 A | 12/1985 | Matsui | |
| 4,805,479 A | 2/1989 | Brightwell | |
| 5,529,268 A | 6/1996 | Wright | |
| 5,742,982 A | 4/1998 | Dodd et al. | |
| 5,887,487 A | 3/1999 | Bravo | |
| 6,332,594 B2 | 12/2001 | Shelton et al. | |
| 6,443,402 B1 | 9/2002 | Ferrill et al. | |
| 6,591,051 B2 | 7/2003 | Solheid et al. | |
| 7,077,363 B2 | 7/2006 | Rivera | |
| 7,150,439 B2 | 12/2006 | Konold | |
| 7,201,352 B2 | 4/2007 | Kawai | |
| 7,210,658 B2 | 5/2007 | Carrera | |
| 7,267,307 B2 | 9/2007 | Bauer | |
| 7,345,241 B2 | 3/2008 | Caveney et al. | |
| 7,527,226 B2 | 5/2009 | Kusuda et al. | |
| 8,074,945 B2 | 12/2011 | Schoenau et al. | |
| 8,285,104 B2 | 10/2012 | Davis et al. | |
| 8,485,479 B2 | 7/2013 | Chiu et al. | |
| 8,620,128 B2 | 12/2013 | Holmberg | |
| 9,042,702 B2 | 5/2015 | Rodriguez | |
| 9,291,791 B2 * | 3/2016 | Sievers | G02B 6/4471 |
| 2002/0166932 A1 | 11/2002 | Sawayanagi et al. | |
| 2006/0237212 A1 | 10/2006 | Komiya | |
| 2008/0169386 A1 | 7/2008 | Schnyder et al. | |
| 2009/0266945 A1 | 10/2009 | Dietrich et al. | |
| 2010/0012792 A1 | 1/2010 | Gollin et al. | |
| 2010/0080512 A1 | 4/2010 | Taylor et al. | |
| 2010/0202740 A1 | 8/2010 | Barlowe et al. | |
| 2012/0097804 A1 | 4/2012 | Liu | |
| 2012/0145838 A1 | 6/2012 | Chiu et al. | |
| 2012/0177334 A1 | 7/2012 | Holmberg et al. | |
| 2013/0140410 A1 | 6/2013 | Lee et al. | |
| 2013/0266282 A1 | 10/2013 | Cote et al. | |

FOREIGN PATENT DOCUMENTS

| | | |
|---|---|---|
| JP | 2004-297926 | 10/2004 |
| WO | 2006065207 A1 | 6/2006 |
| WO | WO 2012/121955 | 9/2012 |

OTHER PUBLICATIONS

International Search Report and Written Opinion for PCT/US2014/021202 dated Jun. 12, 2014.

Optical Distribution Frames 3rd Edition, *TE Connectivity*, 7 pages (abridged) (Jul. 2012).

U.S. Appl. No. 61/704,330, filed Sep. 21, 2012, and titled "Slidable Fiber Optic Connection Module with Cable Slack Management".

U.S. Appl. No. 14/068,444, filed Oct. 31, 2013, and titled "Anchoring Cables to Rack with Cable Clamp Arrangements".

Extended European Search Report for European Application No. 14778522.4 dated Sep. 21, 2016 (9 pgs).

* cited by examiner

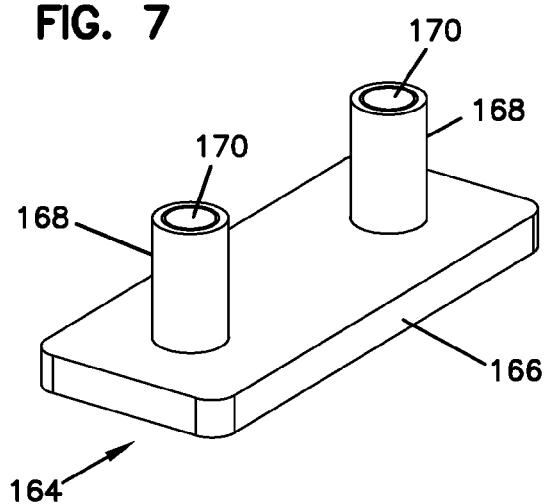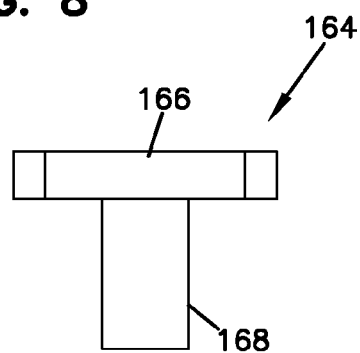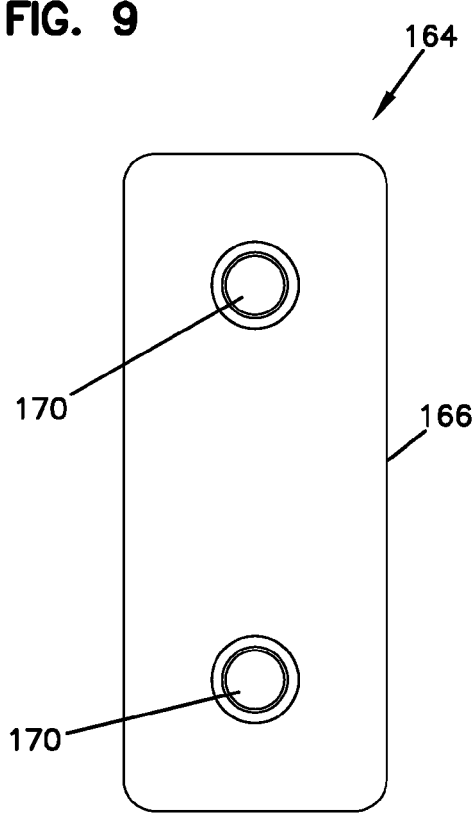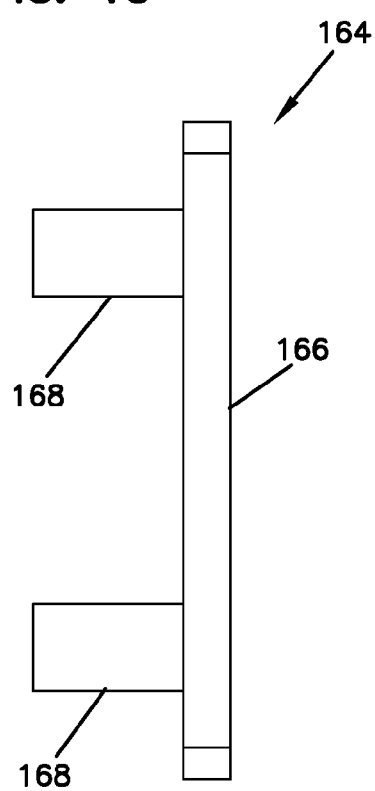

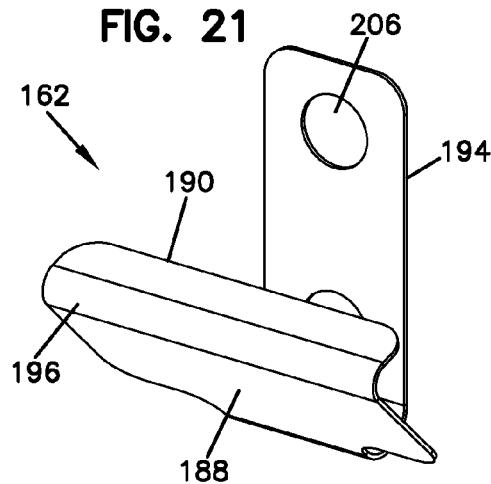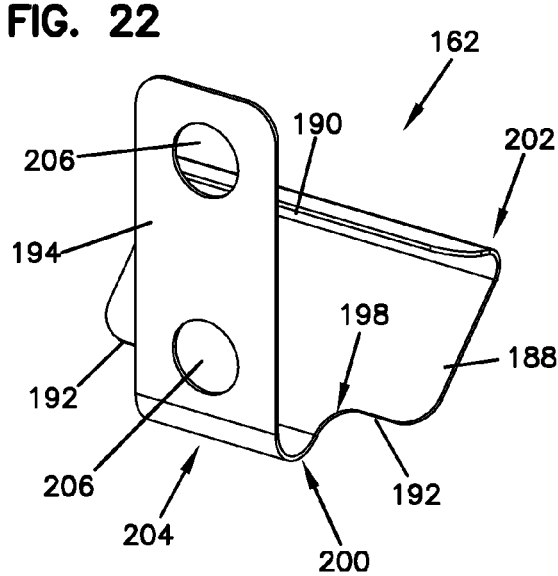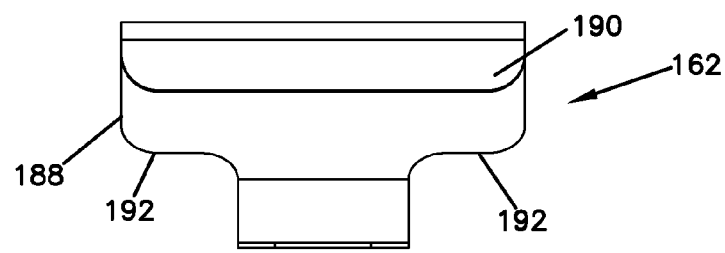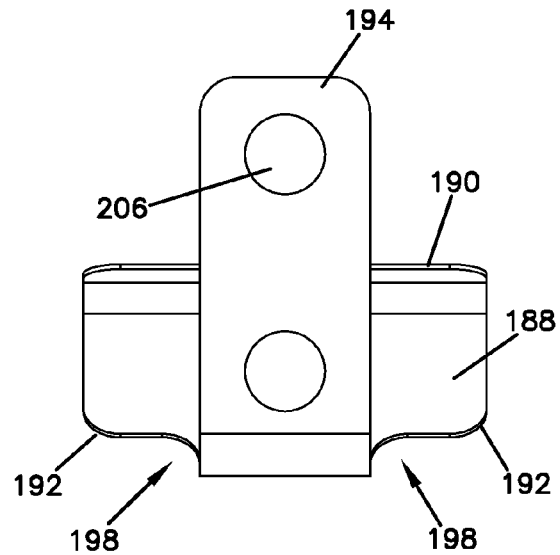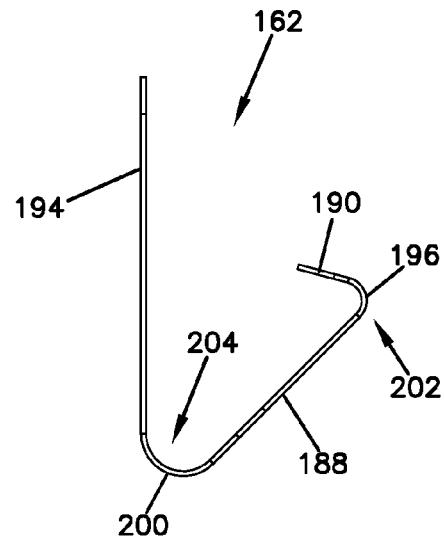

ANCHORING CABLES TO RACK WITH SELF-LOCKING CABLE CLAMP ARRANGEMENTS

CROSS REFERENCE TO RELATED APPLICATIONS

This application is a continuation of U.S. application Ser. No. 14/199,410, filed Mar. 6, 2014, now U.S. Pat. No. 9,291,791, which claims the benefit of U.S. Provisional Application Ser. No. 61/779,659, filed Mar. 13, 2013, which applications are incorporated herein by reference in their entirety.

BACKGROUND

In the telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame and high-density fiber termination blocks (FTBs) which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

Some aspects of the disclosure are directed to a device and a method for securing a cable to a panel including assembling a self-locking cable clamp arrangement; and mounting the self-locking cable clamp arrangement to the panel.

Another aspect of the disclosure is directed to a self-locking cable clamp arrangement for mounting a cable to a panel. The self-locking cable clamp arrangement includes a bracket, a back plate, a grommet, a yoke, and a fastener. The bracket has a bracket body defining a first engagement region, a second engagement region, and a third engagement region where the first engagement region is spaced from the second engagement region by the third engagement region. The engagement regions each define at least two fastener openings. The self-locking cable clamp arrangement further includes a tab having a flange member. The flange member can be configured to attach to the first engagement region or the second engagement region of the bracket. The self-locking cable clamp arrangement also includes a fixing member having a main body and at least two posts. The at least two posts extend outwardly from the main body. The posts engage the at least two fastener openings defined by the third engagement region to attach the fixing member to the third engagement region of the bracket. The posts provide a space between the main body of the fixing member and the bracket when the fixing member is attached to the third engagement region of the bracket. The back plate defines a fastener opening. The grommet is sized and configured to extend around a portion of the cable to form a grommeted cable. The yoke is configured to surround the grommet to mount the grommeted cable to the panel. A first side of the yoke is configured to engage the first engagement region of the bracket so that the grommeted cable extends along the first direction. A second side of the yoke is configured to engage the back plate. The fastener is configured to extend through the fastener opening of the bracket, through the yoke, and through the fastener opening of the backing plate to hold the back plate to the bracket. The fastener is configured to move the back plate and the bracket towards each other to compress the yoke and grommet therebetween.

Other aspects of the disclosure are directed to a cable anchor system including a panel, a fastener, and a self-locking cable clamp arrangement. The panel includes a first mounting section at which a first mounting location is disposed. The first mounting location defines a cutout portion and an elongated slot. The self-locking cable clamp arrangement includes a bracket, the bracket including an engagement section having a tab sized and configured to be received within the cutout portion at the first mounting location. The self-locking arrangement also includes another engagement section having a fixing member attached thereon and sized to slide within the elongated slot at the first mounting location. The tab further includes a lip that is sufficient to hold the bracket to the panel when the lip is engaged within the cutout portion located at the first mounting location. The self-locking cable clamp arrangement further includes a bracket, a grommet, and a back plate. The grommet is configured to be transversely compressed between the bracket and the back plate.

The self-locking cable clamp arrangement includes first mounting a clamp to the cable, and then mounting the clamp to a panel.

Assembling a self-locking cable clamp arrangement includes disposing a grommet around an exterior surface of the cable, disposing a yoke around the grommet so that the yoke at least partially surrounds the grommet, and compressing the yoke and grommet between a bracket and a backing plate using a fastener so that the cable is compressed radially inwardly.

Mounting the self-locking cable clamp arrangement to the panel includes sliding the bracket onto the panel until a tab portion of the bracket being configured to flex is received within a cutout portion of the panel to secure the bracket to the panel.

The panel may include two sides which are staggered relative to one another. The panel may include staggered bracket mounting locations for adjacent self-locking cable clamp arrangements.

In some implementations, the brackets are slid so that posts extending between a fixing member and an engagement region of the bracket move into elongated slots defined in the panel until the tab portion engages the cutout portion. In certain implementations, the tab portion is manually pushed into the cutout portion, wherein the tab portion flexes upon entry into the cutout portion and snaps back once inside the cutout portion to lock the bracket to the panel.

A variety of additional inventive aspects will be set forth in the description that follows. The inventive aspects can relate to individual features and to combinations of features.

It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is a perspective view of a fixing member in accordance with the principles of the present disclosure;

FIG. 8 is a top view of the fixing member of FIG. 7;

FIG. 9 is a front view of the fixing member of FIG. 7;

FIG. 10 is a side view of the fixing member of FIG. 7;

FIG. 21 is a perspective first side view of an example spring tab suitable for use with the bracket of FIG. 15;

FIG. 22 is a perspective second side view of the example spring tab of FIG. 21;

FIG. 23 is a perspective top view of the example spring tab of FIG. 22;

FIG. 24 is a front view of the example spring tab of FIG. 22;

FIG. 25 is an edge view of the example spring tab of FIG. 22;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
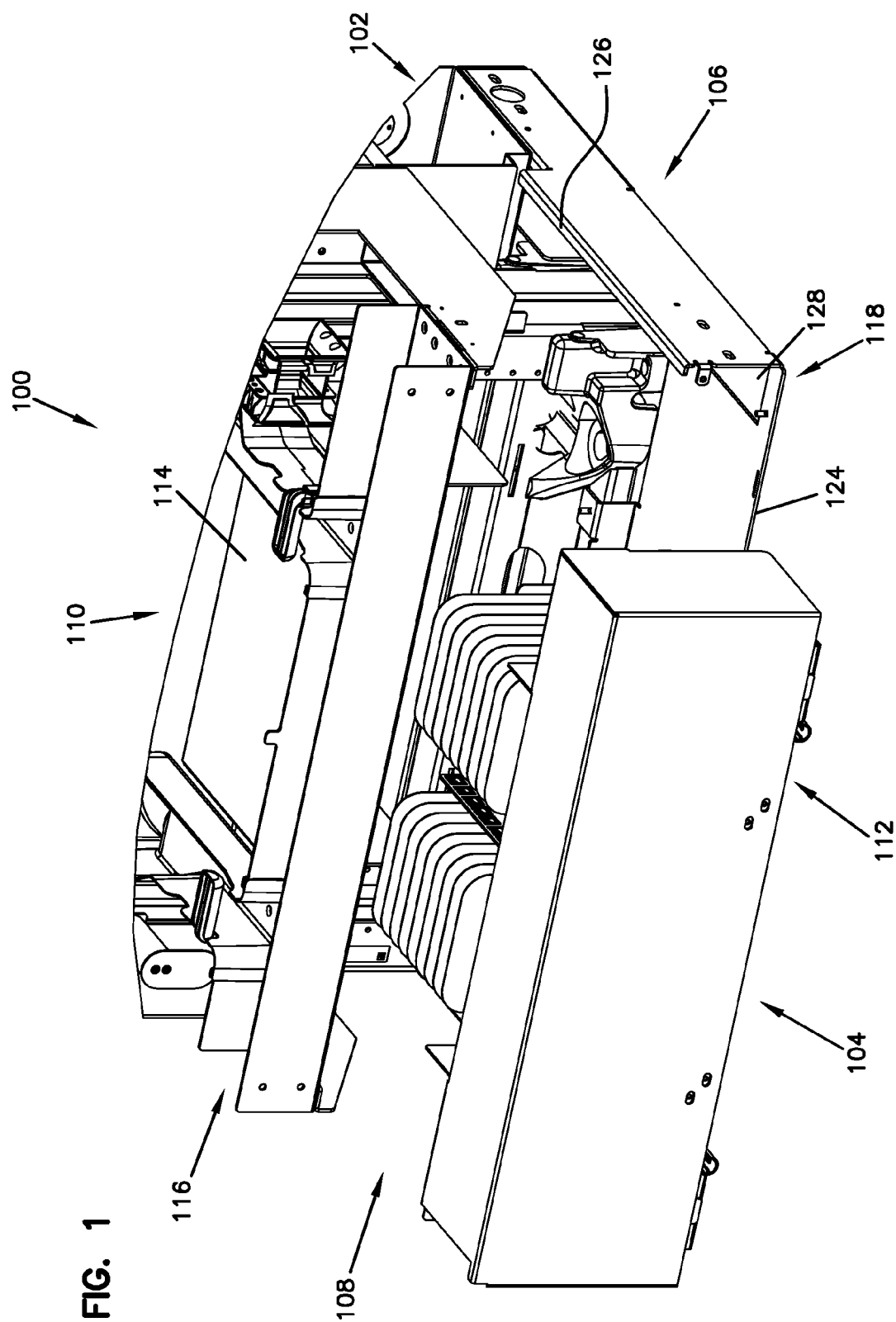
FIG. 1 is a partial perspective view of an example rack including a cable anchor region.
Figure 2:
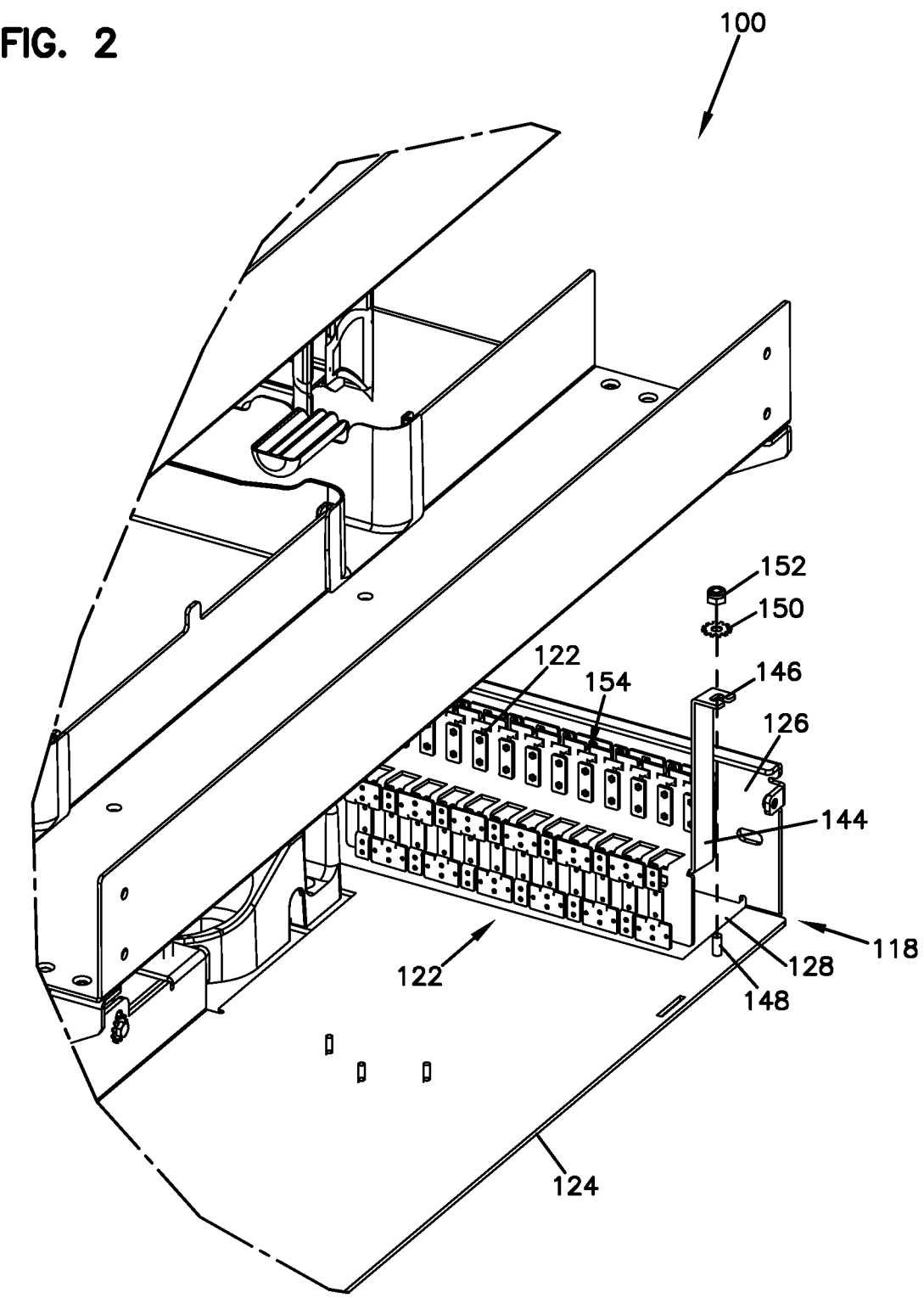
FIG. 2 is a partial perspective view of the cable anchor region of the rack of FIG. 1 with the mounting panel shown exploded upwardly from the rack.

FIG. 1 illustrates an example rack 100 at which optical fibers can be connected. The rack 100 has a front 102, a rear 104, a first side 106, a second side 108, a top 110, and a bottom 112. The rack 100 defines one or more termination regions 114. In certain implementations, the rack 100 includes a vertical stack of termination regions 114. Connection locations at the termination regions 114 are accessible from both the front 102 and rear 104 of the rack 100. A trough system 116 connects each termination region 114 of the rack 100 with other termination regions 114 of the rack 100 or with termination regions 114 of other racks 100.

In some implementations, termination modules are mounted at the termination regions 114. In various implementations, the termination modules can define individually mounted optical adapters, blocks of integrally formed optical adapters, and/or cassettes that include optical adapters having either a multi-fiber connector or a multi-fiber cable extending outwardly therefrom. In certain implementations, termination modules are slidable relative to the rack 100. Example slidable termination modules can be found in U.S. Provisional Application No. 61/704,330, filed Sep. 21, 2012, and titled "Slidable Fiber Optic Connection Module with Cable Slack Management," the disclosure of which is hereby incorporated herein by reference.

The rack 100 includes an anchor region 118 at which one or more optical cables 120 (see FIG. 3, e.g., multi-fiber cables, such as IFC cables) can be secured to the rack 100. In some implementations, the anchor region 118 is located at the rear 104 of the rack 100. In certain implementations, the anchor region 118 is located at the bottom 112 of the rack 100. In other implementations, the anchor region 118 is located at the top 110 of the rack 100. In the example shown, the anchor region 118 is located at the first side 106 of the rack 100 at the bottom 112. The optical cables 120 may be secured to the rack 100 at the anchor region 118. Optical fibers (e.g., loose, buffered, ribbonized, upjacketed, etc.) can extend from the anchor region 118 to equipment on the rack 100 (e.g., the termination modules, splice cassettes, etc.).

In accordance with some aspects of the disclosure, each cable 120 can be secured to the anchor region 118 by first securing the cable 120 to a self-locking cable clamp arrangement (e.g., clamp arrangement 208 of FIG. 26) and then securing the self-locking cable clamp arrangement to the anchor region 118. The cable 120 can be secured to the self-locking cable clamp arrangement at a location remote from the anchor region 118. In fact, the cable 120 can be secured to the self-locking cable clamp arrangement at a location remote from the rack 100 (e.g., at a work station). Accordingly, the self-locking cable clamp arrangement can be assembled and secured to the cable 120 while a user has easy access to the cable 120 and clamp components as will be discussed in more detail herein.

Figure 3:
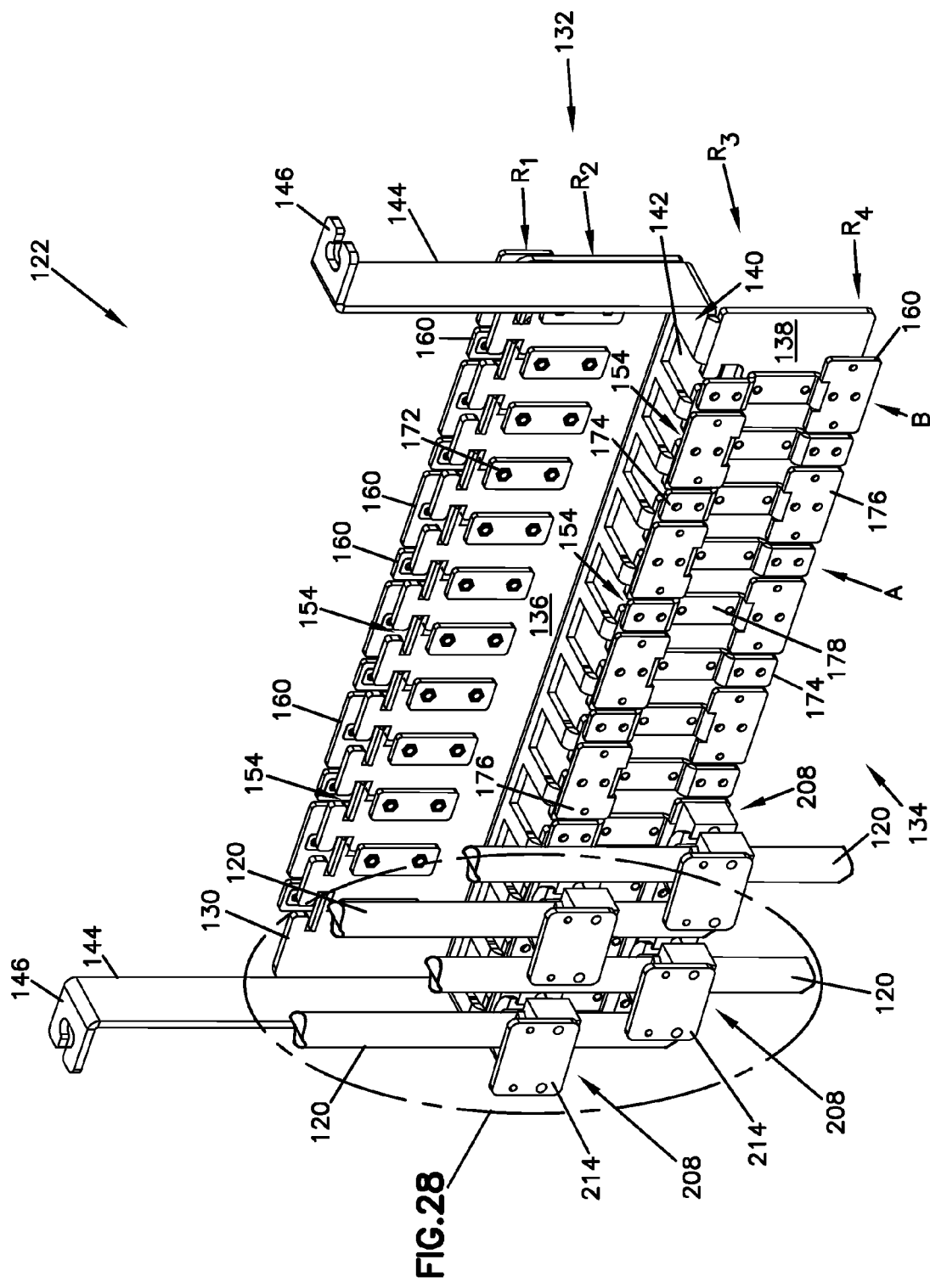
FIG. 3 is a perspective view of cables secured to the mounting panel of FIG. 2 using self-locking cable clamp arrangements.
Figure 4:
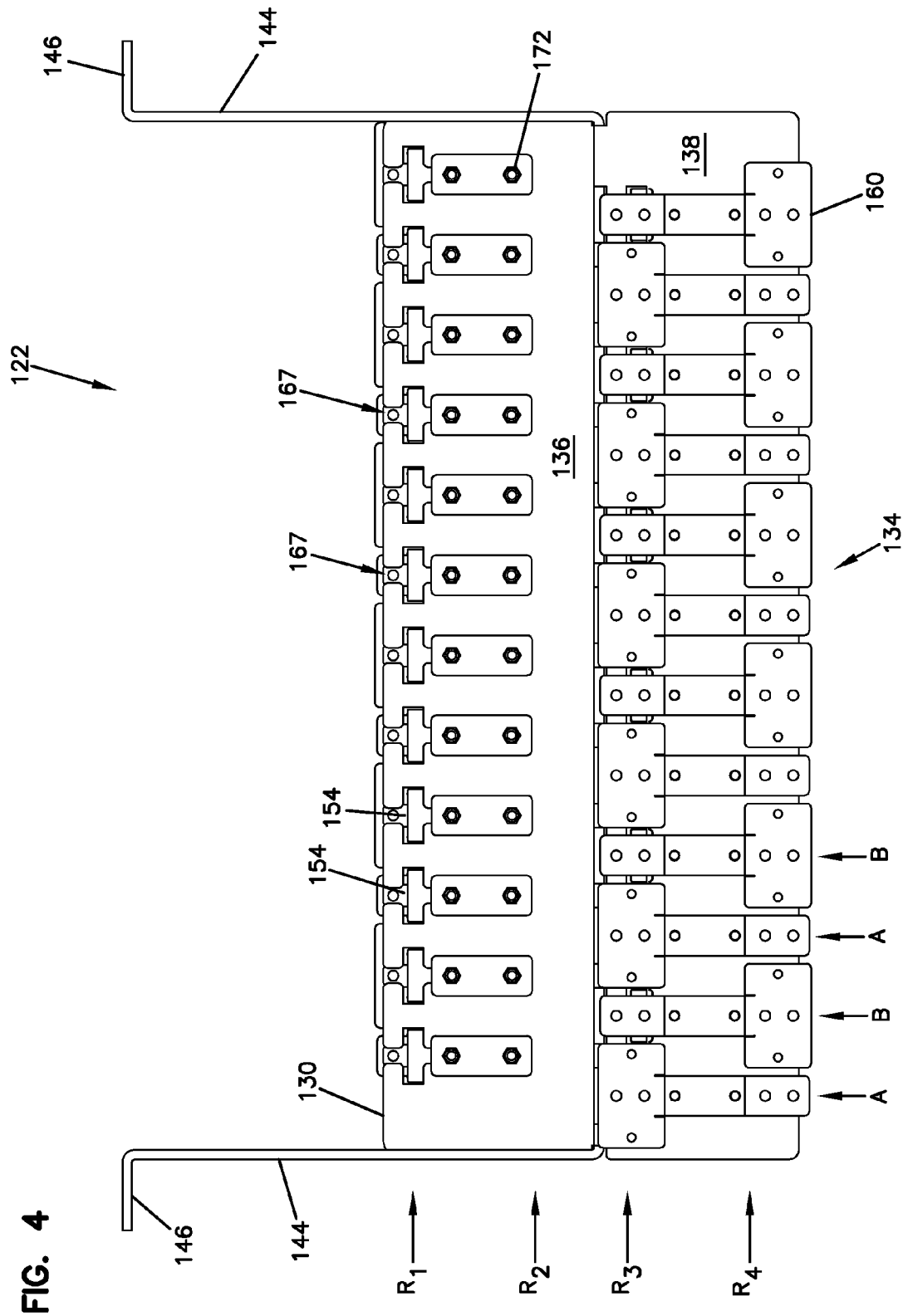
FIG. 4 is a front side elevational view of the mounting panel of FIG. 2.
Figure 5:
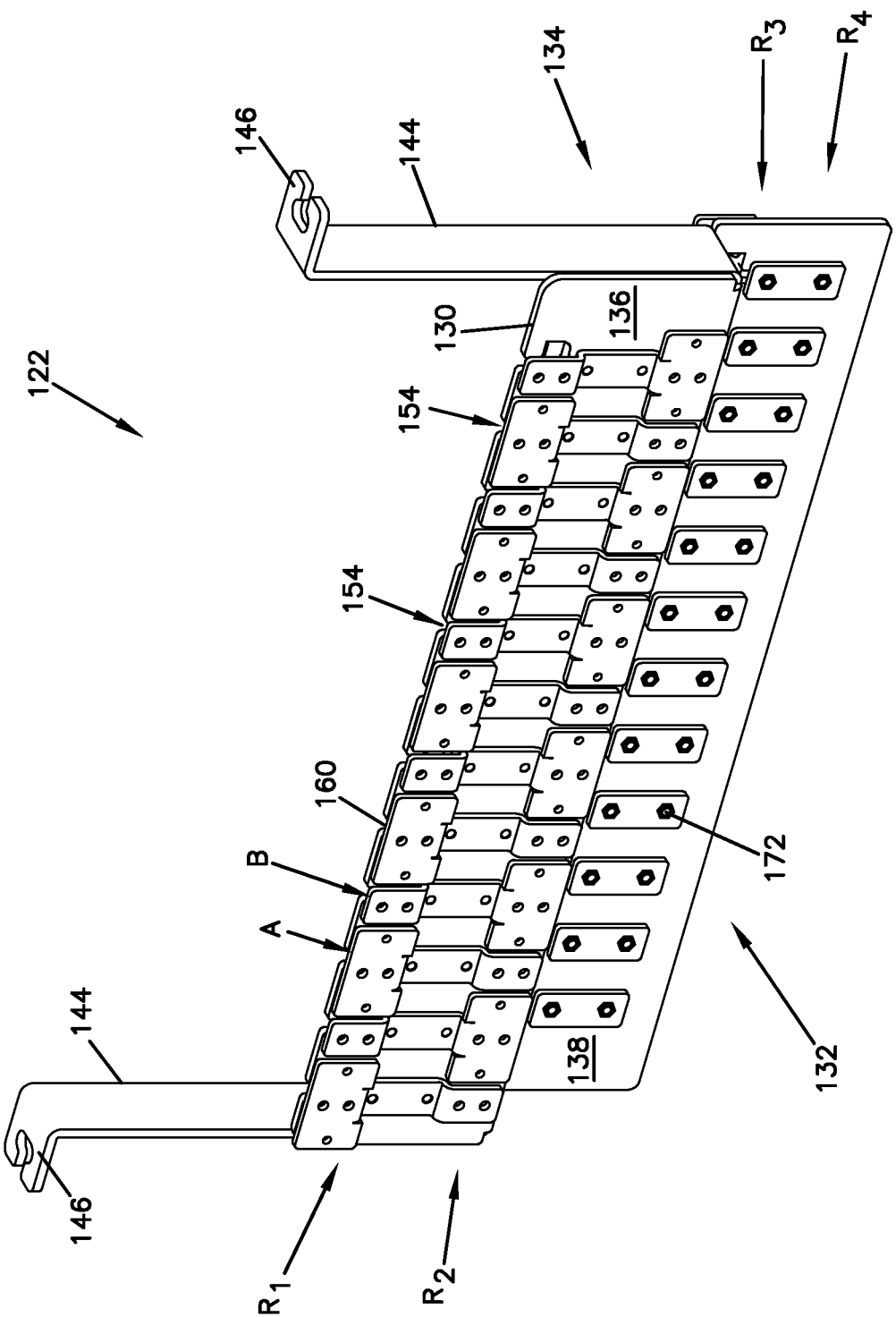
FIG. 5 is a perspective view of the mounting panel of FIG. 2.
Figure 6:
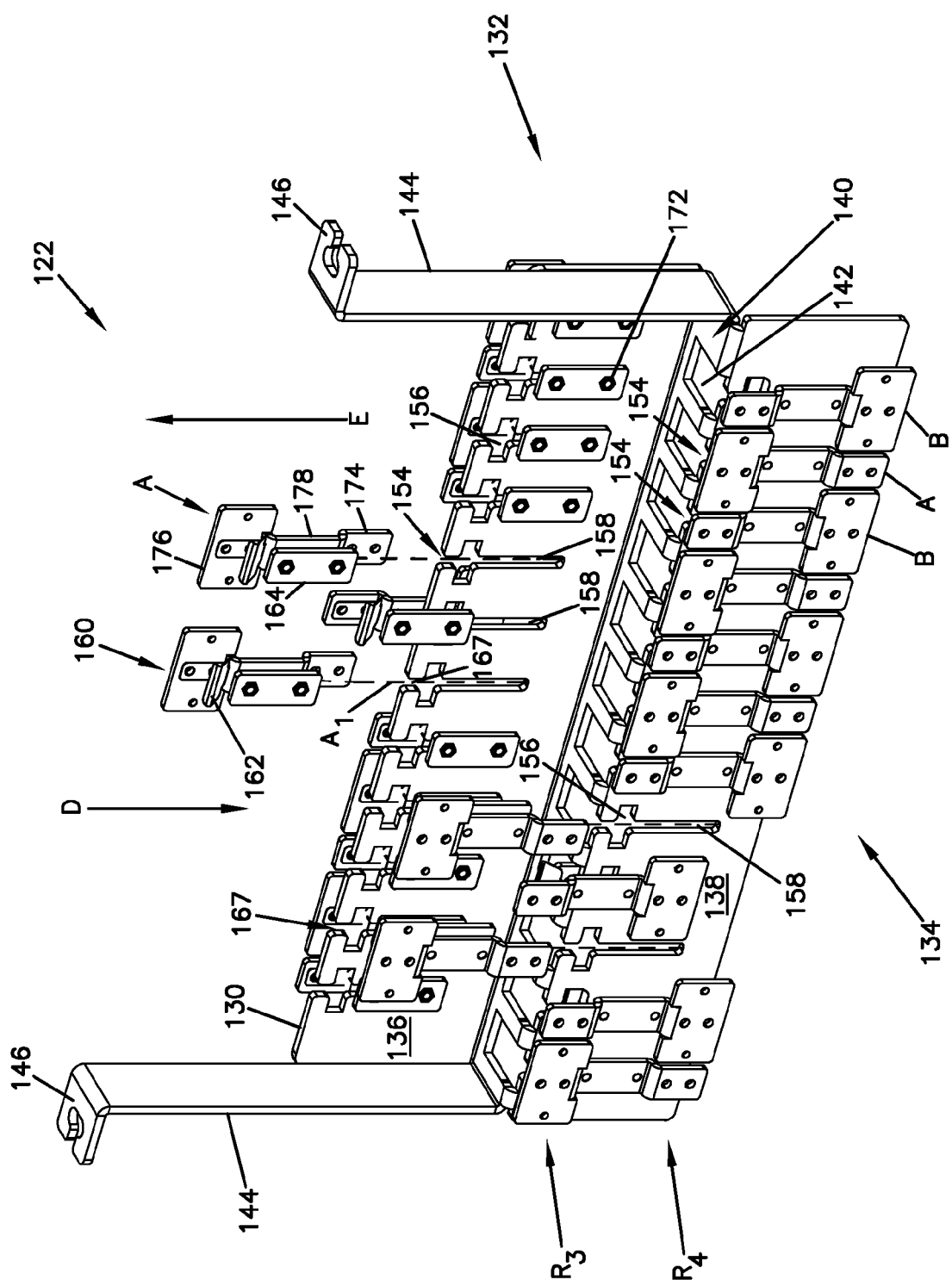
FIG. 6 is a perspective view of the mounting panel of FIG. 2 with self-locking cable clamp arrangements mounted thereon.
Figure 11:
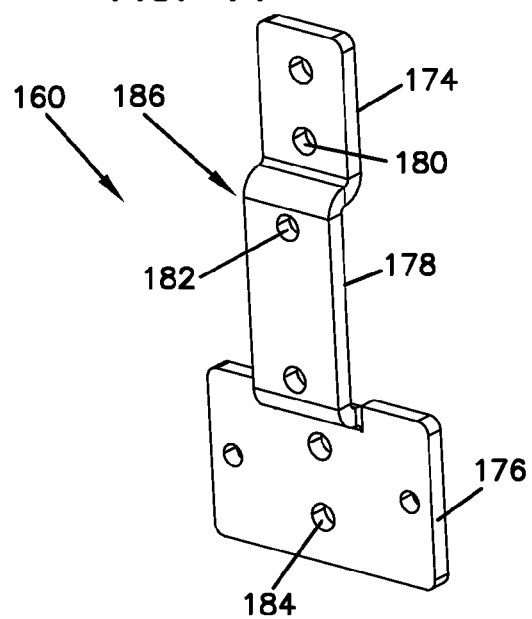
FIG. 11 is a perspective view of an example bracket in accordance with the principles of the present disclosure.
Figure 12:
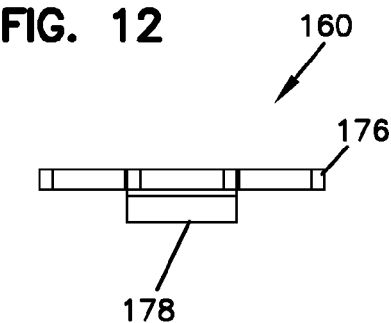
FIG. 12 is a top view of the example bracket of FIG. 11.
Figure 13:
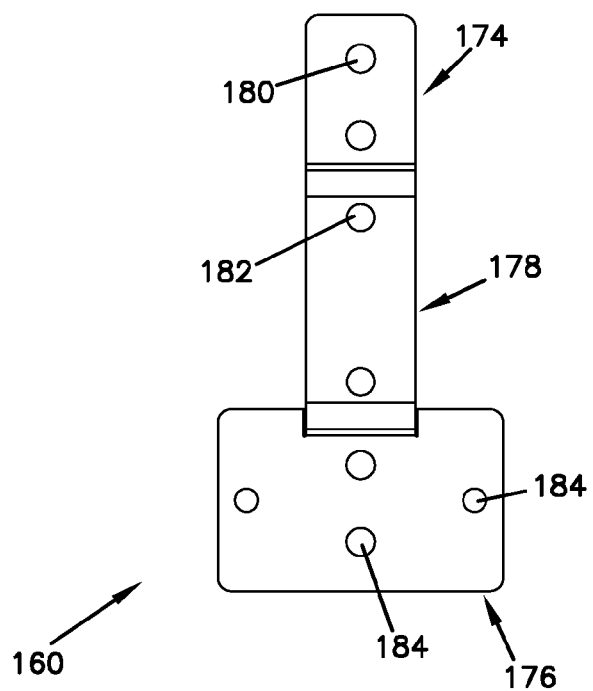
FIG. 13 is a front view of the example bracket of FIG. 11.
Figure 14:
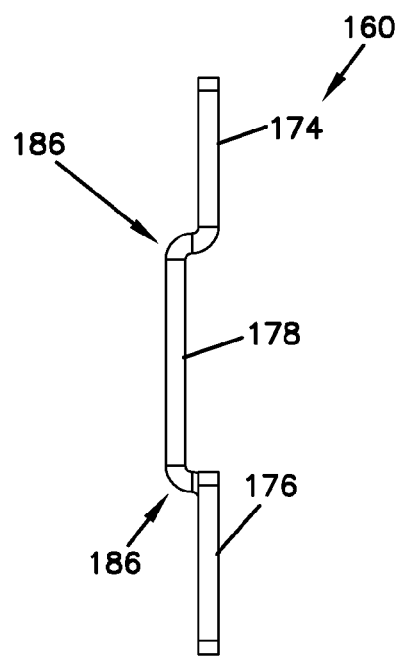
FIG. 14 is an edge view of the example bracket of FIG. 11.
Figure 15:
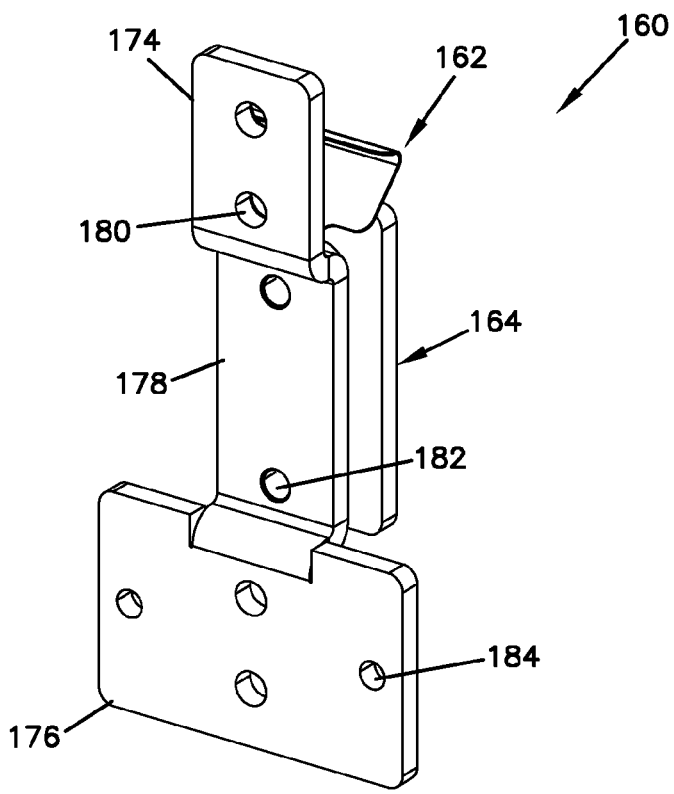
FIG. 15 is a perspective first side view of the example bracket of FIG. 11 with a spring tab and the fixing member of FIG. 7 attached in accordance with the principles of the present disclosure.

FIGS. 2-6 illustrate a mounting panel 122 adapted for use at the anchor region 118. FIG. 3 shows the optical cables 120 secured to the mounting panel 122 (e.g., using the clamp arrangements 208 of FIG. 26). In some implementations, the mounting panel 122 couples to a bottom 112 of the rack 100 and extends downwardly from the rack 100. In the example shown in FIG. 2, the mounting panel 122 hangs from the bottom 112 of the rack 100. For example, the anchor region 118 includes a bottom panel 124 and a side panel 126 that cooperate to define an aperture 128. The mounting panel 122 is coupled to the bottom panel 124 to hang beneath the aperture 128.

As shown in FIGS. 3-6, the mounting panel 122 includes a body 130 having a first side 132 and a second side 134. The body 130 defines a first mounting section 136 and a second mounting section 138. A transition region 140 (see FIGS. 3 and 6) separates the first and second mounting sections 136, 138. The transition region 140 may include a straight section defining a plurality of openings 142 so that the first and second mounting sections 136, 138 are parallel, but offset from each other. In the example shown, the first mounting section 136 is offset towards the first side 132 and the second mounting section 138 is offset towards the second side 134.

Arms 144 extend upwardly from opposite sides of the panel body 130. Mounting flanges 146 are provided at distal ends of the arms 144. The mounting flanges 146 are configured to secure to the bottom panel 124 of the anchor region 118 of the rack 100. In the example shown in FIG. 2, the bottom panel 124 includes one or more pems 148 that are sized to extend through one or more openings defined in the mounting flanges 146. Washers 150 and nuts 152 secure over the pems 148 to hold the mounting flanges 146 to the bottom panel 124. In other implementations, separate fasteners can be utilized to secure the mounting flanges 146 to the bottom panel 124. In still other implementations, the mounting flanges 146 can snap-fit, latch, or otherwise secure to the bottom panel 124. In still other implementations, the mounting flanges 146 can secure to the side panel 126.

The cables 120 can be mounted to the mounting sections 136, 138 (see FIGS. 3-6) without the use of tools, thereby reducing installation time and ergonomic strain on the operator accessing the equipment. For example, the cables 120 can be mounted to the mounting sections 136, 138 using self-locking cable clamp arrangements 208. Each cable clamp arrangement 208 includes a cable clamp (see FIGS. 26 and 27) coupled to a bracket 160 (FIGS. 15-20). The cable clamp holds the cable 120 to the bracket 160 and the bracket 160 holds the cable 120 to the mounting sections 136, 138.

Figure 16:
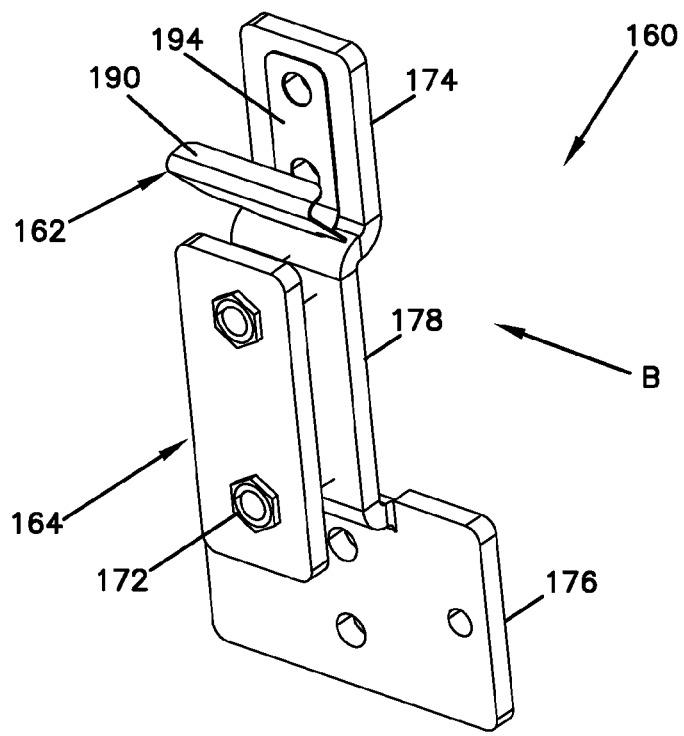
FIG. 16 is a perspective second side view of the example bracket of FIG. 15 shown in a "B" configuration in accordance with the principles of the present disclosure.
Figure 16A:
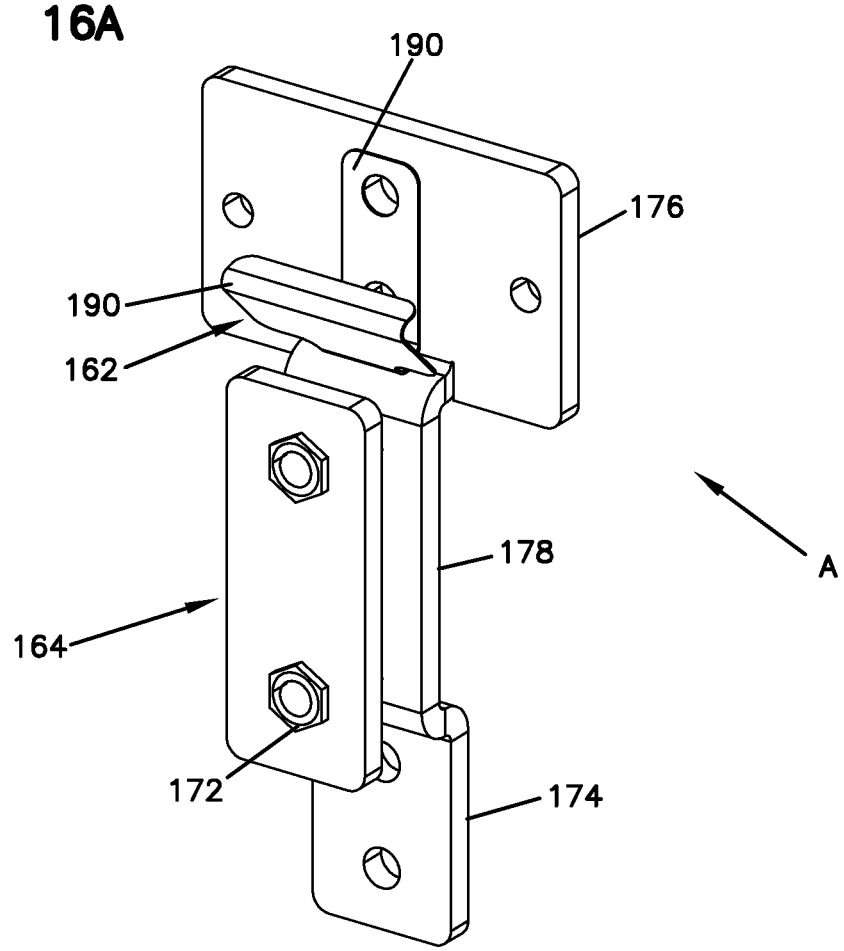
FIG. 16A is a perspective view of the example bracket of FIG. 16 shown in an "A" configuration in accordance with the principles of the present disclosure.
Figure 18:
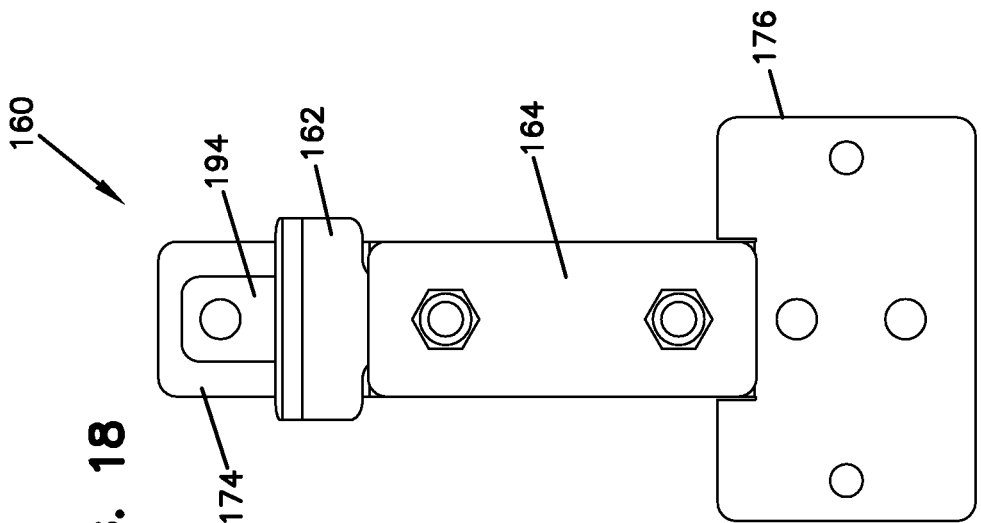
FIG. 18 is a front view of the example bracket of FIG. 16.
Figure 17:
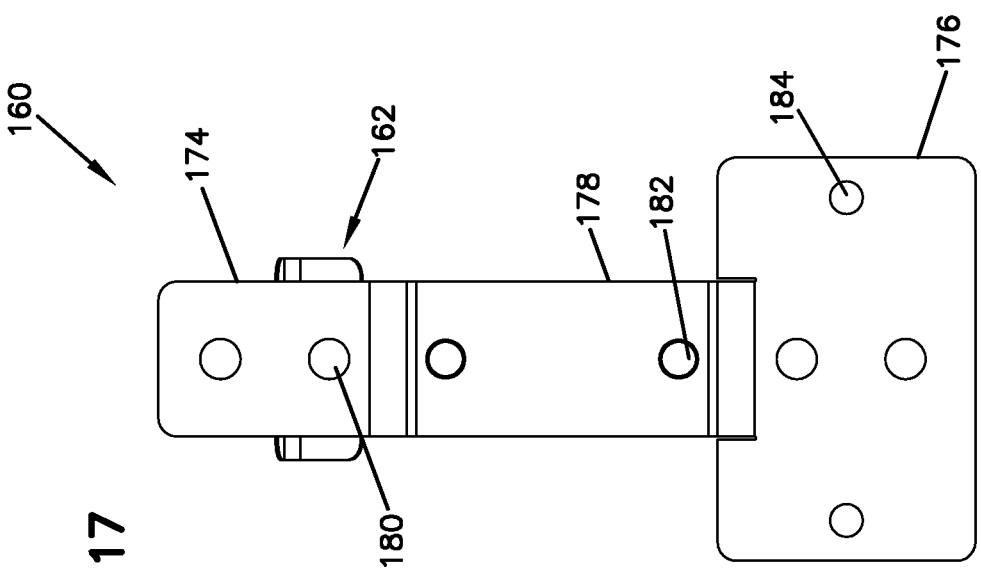
FIG. 17 is a front view of the example bracket of FIG. 15.

The brackets 160 can be mounted to the mounting sections 136, 138 (see FIGS. 3-6) without the use of tools, thereby reducing installation time and ergonomic strain on the operator accessing the equipment. Each bracket 160 includes a first engagement region 174, a second engagement region 176, and a third engagement region 178 (see FIGS. 11-20). A spring tab 162 may be attached to the first engagement region 174 (see FIGS. 16 and 19) or to the second engagement region 176 (see FIG. 16A). A fixing member 164 may be attached to the third engagement region 178 (see FIGS. 16 and 19).

Each of the mounting sections 136, 138 of the mounting panel 122 defines one or more mounting locations 154. Each mounting location 154 includes a cutout portion 156 and an elongated slot 158. Each mounting location 154 is designed to receive a bracket 160. The cutout portions 156 extend generally in a horizontal direction in the body 130 of the mounting panel 122. The cutout portions 156 are generally perpendicular to the elongated slot 158. Each of the cutout portions 156 is sized to receive a portion of a spring tab 162 (see FIGS. 3 and 6) and each elongated slot 158 is designed to receive a portion of a fixing member 164 of a bracket 160.

The spring tabs 162 are configured to releasably engage the cutout portions 156. As shown, the cutout portions 156 are T-shaped. In other embodiments, the cutout portions 156 may vary in shape, such as, but not limited to, circles, ovals, squares, triangles, and the like. The spring tabs 162 are illustrated and described in more detail with reference to FIGS. 21-25.

Referring to FIGS. 7-10, the fixing members 164 of the brackets 160 each include a base 166 and two posts 168 extending from the base 166. It is to be understood that the number of posts 168 on the base 166 of the fixing members 164 may vary with other embodiments. In some implementations, the fixing members 164 include at least two posts 168 to help eliminate shifting, rotating, or other movement of the fixing members 164. As shown, the posts 168 are spaced about an inch apart. It is to be understood that the distance between the posts 168 may vary with other embodiments. The two posts 168 may define fastener openings 170 to receive a mechanical fastener 172 for attaching the fixing member 164 to the bracket 160. The mechanical fasteners 172 may be a snap-in configuration or any mechanical mechanism such as a threaded fastener, a thumb screw, a hex screw, a captive fastener, a pin, a bolt, a dowel, a rivet, a latch, a wire tie, and the like. In other embodiments, the fixing members 164 may be attached to the brackets 160 by press fit or by welding. The brackets 160 are illustrated and described in more detail with reference to FIGS. 11-20.

The at least two posts 168 of the fixing members 164 are positioned in the elongated slots 158 to slidably mount the brackets 160 to the mounting sections 136, 138. In the example shown in FIGS. 3-6, each mounting location 154 is designed such that the cutout portions 156 are located above the elongated slots 158 in each of the mounting sections 136,138. Although the cutout portions 156 and thereby the spring tabs 162 are configured above the elongated slots 158, the brackets 160 can be arranged on the mounting sections 136, 138 of the mounting panel 122 in either an "A" configuration (see FIG. 16A) or a "B" configuration (see FIG. 16). The "A" configuration is when the spring tabs 162 are attached to the second engagement region 176 of the brackets 160. The "B" configuration is when the spring tabs 162 are attached to the first engagement region 174 of the brackets 160. As shown in FIGS. 3-6, the "A" and "B" configurations of the brackets 160 can be arranged to alternate on the mounting sections 136, 138 so that an "ABAB" configuration can be achieved. This arrangement may make it easier to attach the optical cables 120 to the body 130 of the mounting panel 122 without obstruction or overcrowding.

In some implementations, each mounting section 136, 138 defines a row of mounting locations 154. In the example shown in FIGS. 3-6, the cutout portions 156 and the elongated slots 158 are aligned along in a row. In this example, the brackets 160 are arranged to alternate in an "A" and "B" configuration and thereby provide an offset configuration for mounting cables on the mounting panel 122.

In this example, the first mounting section 136 includes mounting locations 154 at a top of the first mounting section 136. The mounting locations 154 have cutout portions 156 and elongated slots 158 that are spaced an equal distance apart. Accordingly, the mounting locations 154 are each configured to receive the various diameter cables without any limitation.

The second mounting section 138 includes mounting locations 154 at a top of the second mounting section 138. The mounting locations 154 have cutout portions 156 and elongated slots 158 that are spaced an equal distance apart.

Accordingly, similar to the first mounting section 136, the mounting locations 154 are each configured to receive various diameter cables without any limitation. In certain implementations, the mounting locations 154 of the second mounting section 138 are offset from the mounting locations 154 of the first mounting section 136. In other configurations, the mounting locations 154 of the second mounting section 138 may be aligned with the mounting locations 154 of the first mounting section 136.

Referring to FIGS. 11-20, the brackets 160 each include a first engagement region 174, a second engagement region 176, and a third engagement region 178. The first engagement region 174 defines one or more apertures 180 wherein the spring tabs 162 may be attached. The second engagement region 176 defines one or more apertures 184 wherein at least two of the apertures may be used to attach the spring tabs 162. The third engagement region 178 defines one or more apertures 182 wherein the fixing members 164 may be attached. For example, FIGS. 15-20 show the brackets 160 with the fixing members 164 and spring tabs 162 attached. The two posts 168 of the fixing members 164 align with the apertures 182 of the brackets 160 to be attached thereon such that the posts 168 extend between the third engagement region 178 of the brackets 160 and the base 166 of the fixing members 164. The posts 168 of the fixing members 164 may vary in length and diameter to be sized to accommodate various mounting location configurations on mounting panels. Attachments to the first, second, and third engagement regions 174, 176, 178, may be completed by using a mechanical fastener such as, but not limited to, a threaded fastener, a thumb screw, a hex screw, a captive fastener, a pin, a bolt, a dowel, a rivet, a latch, a wire tie, and the like. In other embodiments, attachments to the first, second, and third engagement regions 174, 176, 178, may be completed by a snap-in configuration, press fit, or welding. The brackets 160 each have two transition regions 186 (see FIGS. 14 and 19) that are curved or contoured so that the third engagement region 178 is parallel to and offset from the first and second engagement regions 174, 176. For example, the transition regions 186 may be contoured to accommodate the two posts 168 of the fixing members 164 in order to mount the brackets 160 to the mounting panel 122.

Referring to FIGS. 21-25, the spring tabs 162 include a body 188, a lip 190, shoulders 192, and a flange member 194. The lip 190 can have a first contoured section 196 that extends from the body 188 so that the lip 190 projects outwardly towards the flange member 194. The shoulders 192 (see FIGS. 22 and 24) are formed on opposite sides of the body 188 and each have a tapered lead-in portion 198 such that the body 188 is wider towards the lip 190 and narrows towards the flange member 194. A second contoured section 200 (see FIG. 25) is located between the shoulders 192 and the flange member 194. In this example, the body 188, the lip 190, the shoulders 192, and the flange member 194 are integrated together to form a unitary tab. The spring tabs 162 may be made of a metal (e.g., steel or other material) with elastic characteristics or a plastic material that allow the spring tabs 162 to be flexible about flex points 202, 204 (see FIG. 22). The flange member 194 defines openings 206 for receiving mechanical fasteners 172 (see FIG. 19) such as, but not limited to, a threaded fastener, a thumb screw, a hex screw, a captive fastener, a pin, a bolt, a dowel, a rivet, a latch, a wire tie, and the like. In other embodiments, the fastening mechanism may be a snap-in configuration, press fit, or welding. The mechanical fasteners 172 engage openings 180, 184 of the brackets 160 to attach the flange members 194 to the brackets 160.

Figure 19:
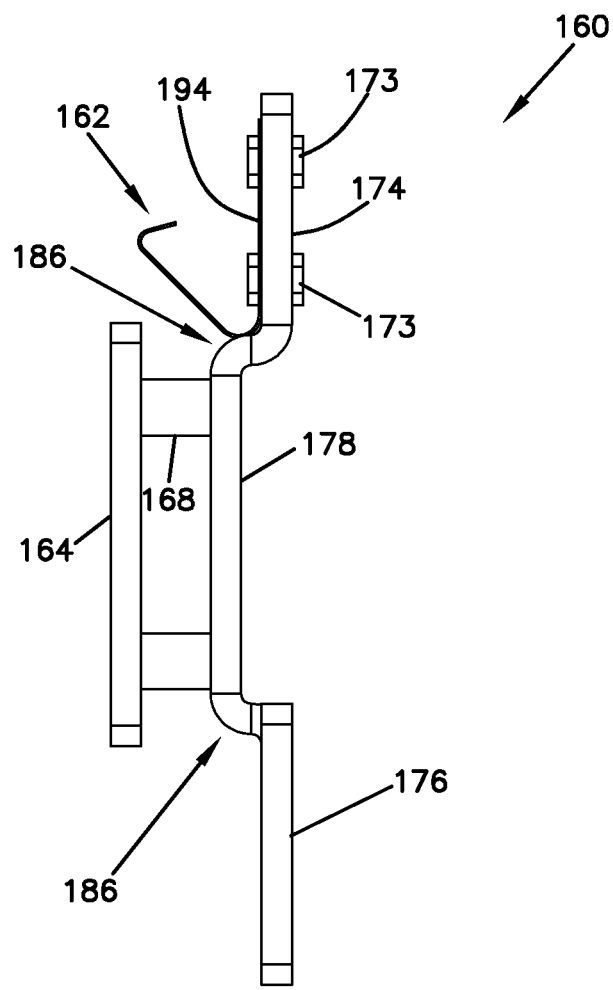
FIG. 19 is a side view of the example bracket of FIG. 16.
Figure 20:
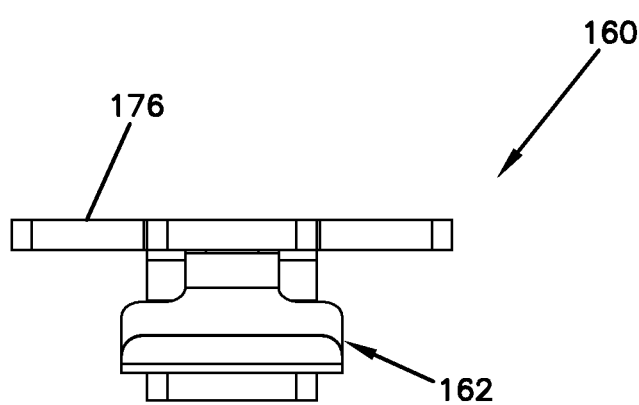
FIG. 20 is a top view of the example bracket of FIG. 16.

Turning again to FIGS. 6 and 15-16, the flange member 194 of the spring tabs 162 may be attached to the brackets 160 at the first and second engagement regions 174, 176. In other words, the spring tabs 162 can be moved so that they attach to either the first engagement region 174 or the second engagement region 176 of the brackets 160. FIG. 19 shows the mechanical fasteners 172 being used to attach the spring tabs 162 to the first engagement regions 174. Similarly, the mechanical fasteners 172 can be used to attach the spring tabs 162 to the second engagement regions 176. Although the spring tabs 162 may move to be attached to either the first or second engagement regions 174, 176 of the brackets 160, the spring tabs 162 are shown in this example to be arranged along the top of the body 130 of the mounting panel 122. The brackets 160 may be arranged on the mounting panel 122 such that either the first or the second engagement regions 174, 176 are aligned at the top of the body 130. For example, in the "A" configuration (see FIG. 16A), the flange member 194 of the spring tab 162 is attached to the second engagement region 176 of the bracket 160 so that the second engagement region 176 is above the first engagement region 174 when the bracket 160 is mounted to the mounting panel 122. Whereas, in the "B" configuration (see FIG. 16), the flange member 194 of the spring tabs 162 is attached to the first engagement region 174 of the bracket 160 so that the first engagement region 174 is positioned above the second engagement region 176 when mounted to the mounting panel 122. The brackets 160 can be mounted to the mounting panel 122 in this alternating "A" and "B" configuration.

In general, a cable 120 can be secured to the mounting panel 122 using a self-locking cable clamp arrangement. In accordance with some aspects of the disclosure, the self-locking cable clamp arrangement is configured to mount first to the cable 120 and second to the mounting panel 122. Accordingly, the self-locking cable clamp arrangement can be assembled and secured to the cable 120 while a user has easy access to the cable and clamp components. The self-locking cable clamp arrangement is configured to facilitate installation of the self-locking cable clamp arrangement on the mounting panel 122. For example, the self-locking cable clamp arrangement can be configured to reduce the amount of steps in a mounting process for securing the self-locking cable clamp arrangement to the mounting panel 122. The self-locking cable clamp arrangement can be configured to reduce the number of loose components when positioning the self-locking cable clamp arrangement at the mounting panel 122, which may be located in an awkward place at a bottom or top of the rack 100.

FIGS. 26-29 illustrate one example self-locking cable clamp arrangement 208 suitable for use with a cable 120 and the mounting panel 122. The self-locking cable clamp arrangement 208 includes a cable clamp and a bracket 160. The cable clamp includes a grommet 210, a yoke 212, a back plate 214, and fasteners 216. The fasteners 216 extend through two or more of the components to enable radial compression of the grommet 210 around the cable 120 as will be described in more detail herein. The bracket 160 is configured to facilitate installation of the self-locking cable clamp arrangement 208 to the mounting panel 122 as will be disclosed in more detail herein. FIGS. 15-20 illustrate one example bracket 160 previously described suitable for use with the self-locking cable clamp arrangement 208.

Figure 26:
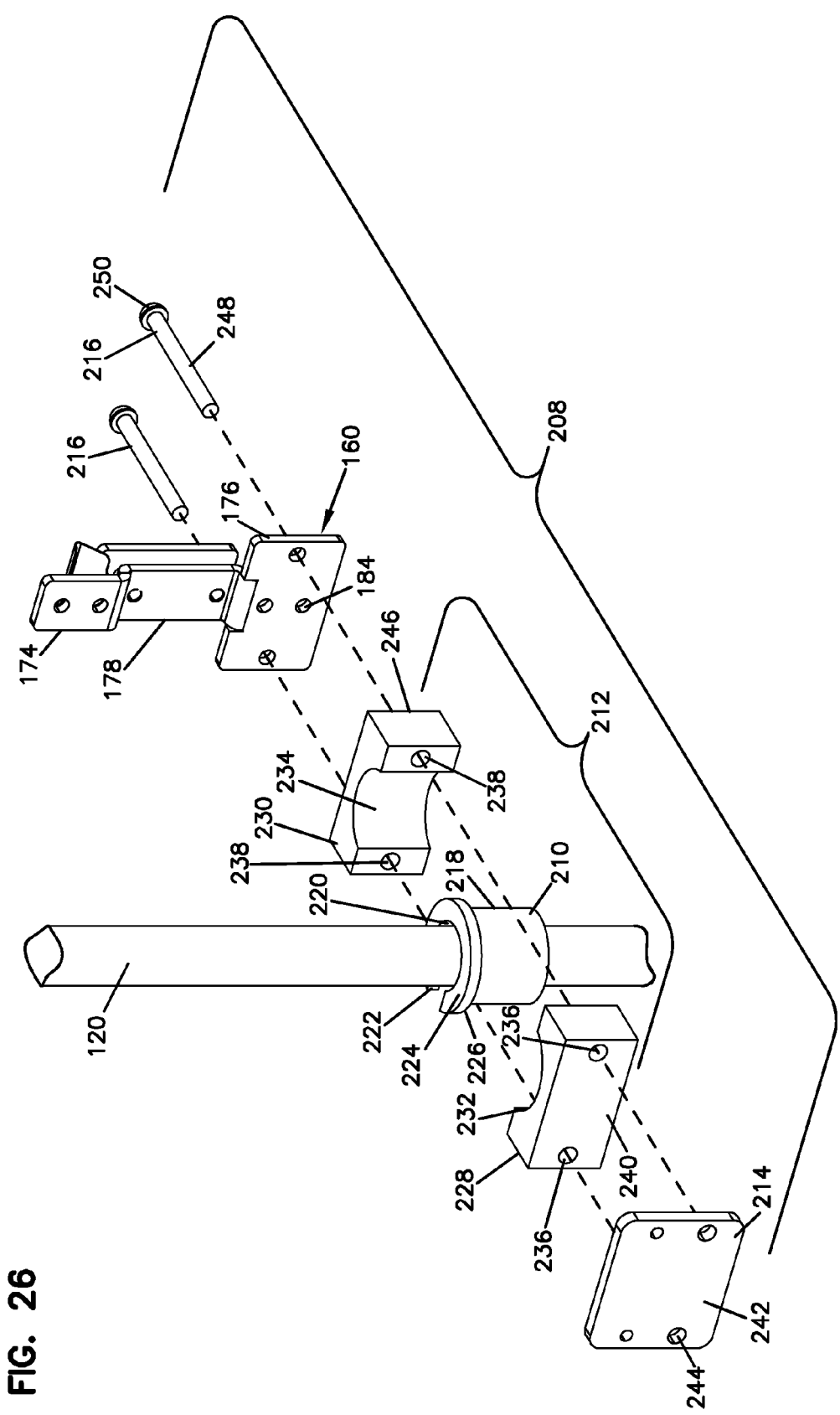
FIG. 26 is an exploded view of an example cable clamp arrangement in accordance with the principles of the present disclosure.
Figure 27:
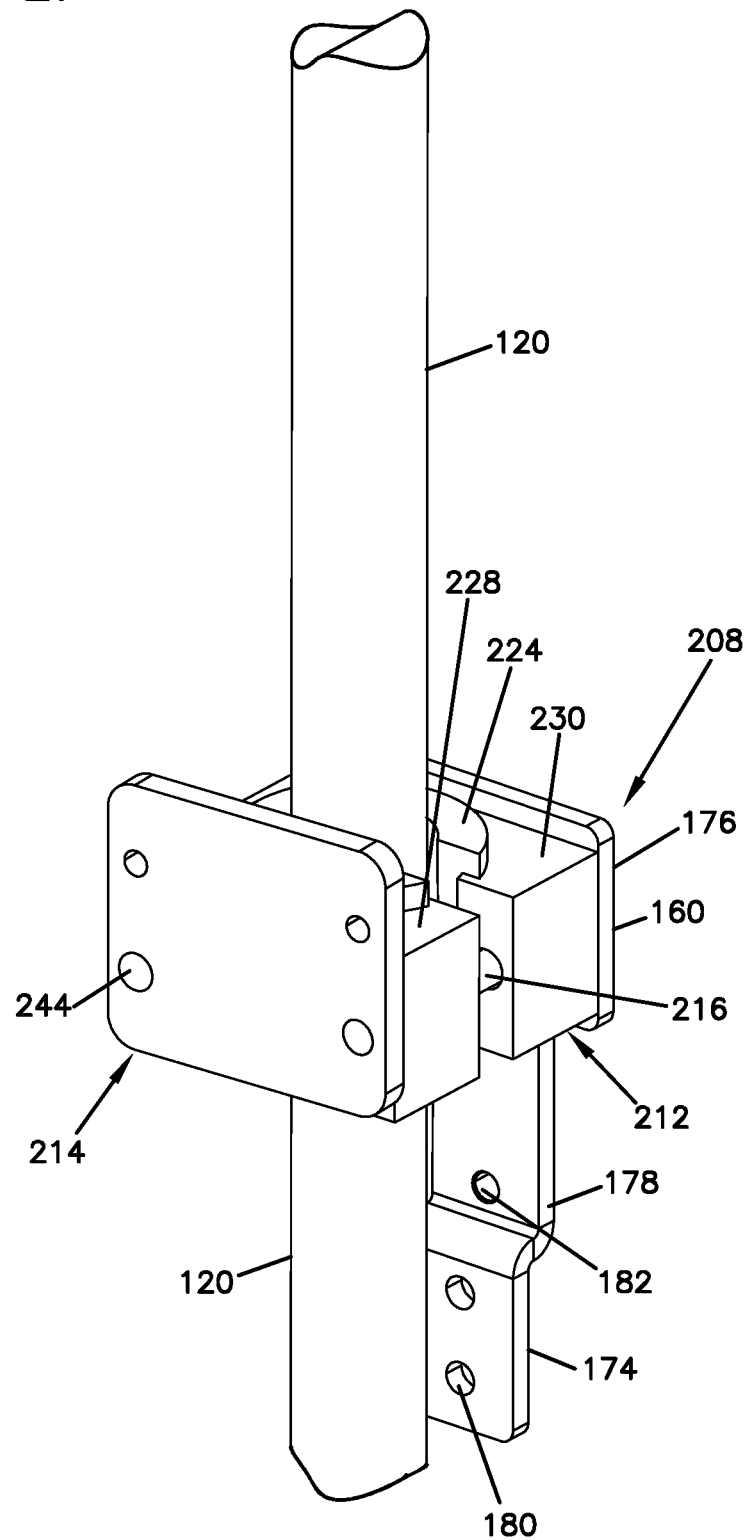
FIG. 27 is a perspective view of the cable clamp arrangement of FIG. 26 secured to a cable.

As shown in FIG. 26, the grommet 210 is configured to fit around an exterior surface of the cable 120. In some implementations, the grommet 210 includes a ring-shaped body 218 defining a passage 220 therethrough. The body 218 also defines a slit 222 leading from an exterior surface of the body 218 to the passage 220. The body 218 of the grommet 210 is sufficiently flexible to enable the cable 120 to enter the passage 220 through the slit 222. The cable 120 extends generally in a first direction when extending through the passage 220. In certain implementations, the body 218 includes a ledge 224 extending radially outwardly from the body 218 to define an abutment surface 226.

The yoke 212 is configured to surround the grommet 210. In certain implementations, the yoke 212 fully surrounds the grommet 210. In other implementations, the yoke parts 228, 230 are spaced apart when mounted around the grommet 210. In some implementations, the grommet 210 and the yoke 212 can be secured to each other to inhibit movement in at least one axial direction. In certain implementations, the grommet ledge 224 seats on the yoke 212 so that the abutment surface 226 engages a top of the yoke 212. In other implementations, the grommet 210 can define top and bottom ledges that sandwich the yoke 212 in between. In still other implementations, the grommet 210 is not axially secured to the yoke 212.

In some implementations, the yoke 212 includes a first part 228 and a second part 230 that is separate from the first part 228. Each of the parts 228, 230 defines a recessed section 232, 234, respectively, that is shaped to receive a portion of the grommet 210. Each of the yoke parts 228, 230 also defines through holes 236, 238 that align when the first and second parts 228, 230, respectively, are positioned around the grommet 210. In other implementations, the first and second parts 228, 230 of the yoke 212 can be pivotally or otherwise movably connected to each other so that the yoke 212 can be wrapped or otherwise disposed around the grommet 210.

The back plate 214 is configured to engage a first exterior surface 240 of the yoke 212. The back plate 214 includes a plate body 242 defining one or more apertures 244. The apertures 244 of the back plate 214 align with the holes 236, 238 of the yoke 212. The bracket 160 is configured to engage a second exterior surface 246 of the yoke 212. The bracket 160 defines one or more apertures 184 that align with the apertures 244 of the back plate 214 and the holes 236, 238 of the yoke 212.

The self-locking cable clamp arrangement 208 is assembled by inserting the cable 120 into the grommet 210, assembling the yoke 212, back plate 214, and bracket 160 around the grommet 210, and inserting the fasteners 216 to extend through the bracket 160, yoke 212, and back plate 214. The fasteners 216 include elongated bodies 248 extending between heads 250 and free ends. The heads 250 engage the bracket 160 and the free ends extend through the back plate 214. In certain implementations, the fasteners 216 thread to the back plate 214. In other implementations, nuts are threaded over ends of the fasteners 216 protruding through the back plate 214. As noted above, the self-locking cable clamp arrangement 208 can be assembled at a location remote from the anchor region 118 of the rack 100. For example, the self-locking cable clamp arrangement 208 can be assembled at a location that provides the user with easy access to the cable clamp arrangement 208 and the cable 120. After assembling the cable 120 to the cable clamp arrangement 208, the assembled arrangement can be mounted to the anchor region 118 of the rack 100.

Figure 28:
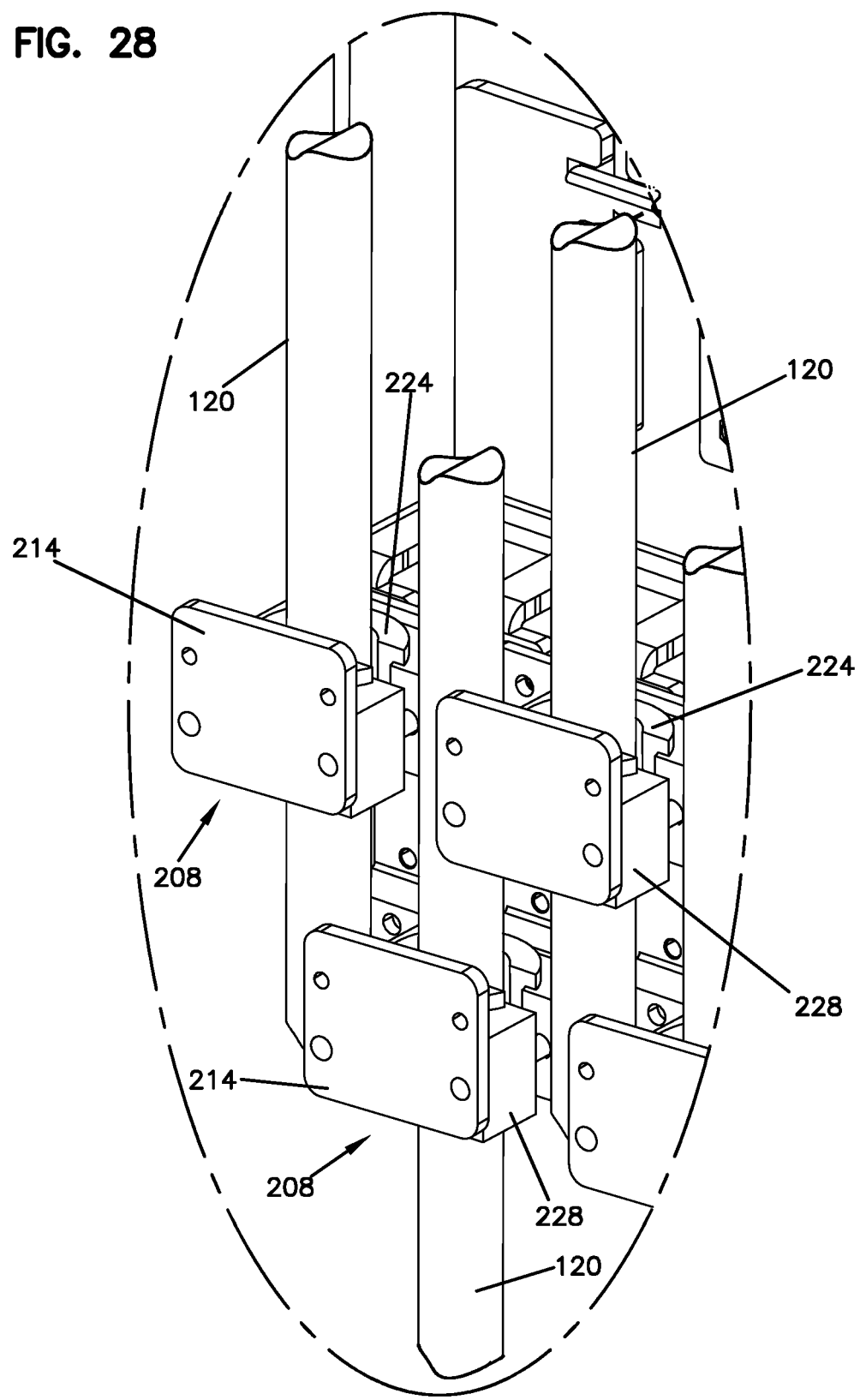
FIG. 28 is an enlarged view of a section of FIG. 3.

FIGS. 28-29 illustrate one example self-locking cable clamp arrangement 208 assembled around a cable 120 and secured to the mounting panel 122 at one of the mounting locations 154. To mount the assembled self-locking cable clamp arrangement 208, the brackets 160 of the self-locking cable clamp arrangements 208 are inserted into the mounting locations 154 of the mounting panel 122 by aligning the brackets 160 along axis $A_1$ (see FIG. 6). The brackets 160 may be pushed manually by hand in direction D (see FIG. 6) for insertion into the mounting locations 154 of the first and second mounting sections 136, 138. During insertion, the posts 168 of the fixing members 164 enter at the mounting locations 154 through a gap 167 at the top of the body 130 of the mounting panel 122. The gap 167 is spaced so that the posts 168 can be received through the gap 167 and move past the gap 167 into the cutout portion 156. The posts 168 continue to move in the direction D until the posts 168 engage and are received within the elongated slots 158 located on the first and/or second mounting sections 136, 138. The posts 168 can be sized so that the base 166 of the fixing member 164 can be parallel to and mating with the body 130 of the mounting panel 122 while the third engagement region 178 can be parallel to and mating with the opposite side of the body 130 of the mounting panel 122. The elongated slots 158 are sized so that the posts 168 can rest snuggly within the elongated slots 158 without shifting or turning. The brackets 160 can be inserted in the direction D until the spring tabs 162 compress enough to allow the bodies 188 to flex about flex points 204 so that the bodies 188 can engage and be received within the cutout portions 156. During insertion, the lips 190 of the spring tabs 162 can flex about flex points 202 to help retain the brackets 160 within the mounting locations 154 of the first and second mounting sections 136, 138 of the mounting panel 122.

The brackets 160 can be mounted at the mounting locations 154 on the mounting panel 122 without the use of tools, which may help to reduce the installation and/or removal time of the brackets 160 and limit ergonomic strain. For example, the anchor region 118 can be located sufficiently high on the rack 100 to cause a user to reach over the user's head or sufficiently low on the rack 100 to cause a user to squat or kneel to reach the mounting panel 122. By enabling mounting of the brackets 160 without the use of tools, a user is not forced to manipulate tools at such low visibility and/or difficult-to-reach locations. While the brackets 160 are manually inserted by hand, the posts 168 are positioned within the elongated slots 158 until the bodies 188 and lips 190 of the spring tabs 162 can releasably engage the cutout portions 156 at the mounting locations 154. The lips 190 of the spring tabs 162 help to keep the brackets 160 on the first and second mounting sections 136, 138 by preventing the brackets 160 from sliding out of the mounting locations 154.

In some implementations, the self-locking cable clamp arrangements 208 also can be easily removed from the first and second mounting sections 136, 138 manually without the use of tools. For example, the bracket 160 of a self-locking cable clamp arrangement 208 can be removed from a respective one of the mounting locations 154 without the use of tools. For example, a bracket 160 may be removed from the panel 122 by manually flexing the spring tab 162 of the bracket 160 about points 202, 204 and sliding the bracket 160 in direction E (see FIG. 6) until the posts 168 of the bracket 160 clear the elongated slots 158. In other implementations, the spring tab 162 can be flexed using a tool (e.g., such as a flat-head screwdriver).

In accordance with some aspects, the self-locking cable clamp arrangements 208 can be removed from the mounting panel 122 even when it is populated with other self-locking cable clamp arrangements 208. In some implementations, cables 120 can be clamped and anchored to both sides 132, 134 of the panel 122. For example, in certain implementations, the clamped cables 120 are mounted to the first side 132 of the mounting panel 122 at the first mounting section 136 and are mounted to the second side 134 of the mounting panel 122 at the second mounting section 138. Offsetting the mounting sections 136, 138 inhibits interference with the mounting of the self-locking cable clamp arrangements 208 to opposite sides of the panel 122.

The panel 122 and self-locking cable clamp arrangements 208 mount the cables 120 to the rack 100 in rows $R_1, R_2, R_3, R_4$ (see FIGS. 3-6) on the mounting panel 122. The self-locking cable clamp arrangements 208 can be mounted to the first and second mounting sections 136,138 of the mounting panel 122 in rows $R_1, R_2, R_3, R_4$. The self-locking cable clamp arrangements 208 can be mounted onto the first mounting section 136 and the cables 120 can be mounted alternating between rows $R_1, R_2$. The self-locking cable clamp arrangements 208 can be mounted on the second mounting section 138 and the cables 120 can be mounted alternating between rows $R_3, R_4$ (see FIGS. 3 and 28). The self-locking cable clamp arrangements 208 are mounted only to the second engagement region 176 of the brackets 160. Because the brackets 160 can be mounted to the mounting panel 122 in the alternating "A" and "B" configurations, the self-locking cable clamp arrangements 208 can be mounted so that they alternate between rows as depicted in FIGS. 3 and 28. Rows $R_1, R_2$ relate to the first mounting section 136 of the mounting panel 122 and the self-locking cable clamp arrangements 208 can be located at the first side 132 of the mounting panel 122. Rows $R_3, R_4$ relate to the second mounting section 138 of the mounting panel 122 and the self-locking cable clamp arrangements 208 can be located on the second side 134 of the mounting panel 122. The self-locking cable clamp arrangements 208 mounted in each respective row on the first and second mounting sections 136, 138 can be staggered relative to each other because the self-locking cable clamp arrangements 208 are only attached to the second engagement regions 176 of the brackets 160 (see FIGS. 3 and 28).

In some implementations, a guide (not shown) can be installed to the rack 100 at the anchor region 118. For example, the guide can be installed at the aperture 128 defined at the anchor region 118. In some implementations, the guide includes a body that extends upwardly from the bottom panel 124 to inhibit bending of the cables that otherwise might result in an interference with an installed splice chassis or other equipment at the rack. In certain implementations, the guide body extends through the aperture 128. In certain implementations, the guide body includes one or more tabs that seat on the bottom panel 124 of the anchor region 118 to hold the guide in position. In certain implementations, the guide body includes a fastener tab. One or more fasteners (e.g., pems, screws, bolts, rivets, etc.) can extend through the fastener tab and into the bottom panel 124 and/or into one of the mounting flanges 146 of the mounting panel 122.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of securing a cable to a panel, the method comprising:
   providing a self-locking cable clamp arrangement including a bracket having a cable mounting region;
   clamping a cable to the cable mounting region of the bracket of the self-locking cable clamp arrangement to form a cable clamp assembly; and
   mounting the cable clamp assembly to the panel including sliding the bracket downwardly through an open-ended slot defined in a face of the panel until a tab portion of the bracket is received within a cutout portion in the face of the panel to secure the bracket to the panel, the cutout portion being in same plane as the open ended slot, wherein the cable is not positioned in the open-ended slot.

2. The method of claim 1, wherein the bracket is oriented so that the cable mounting region is disposed at the cutout region.

3. The method of claim 1, wherein the bracket is oriented so that the cable mounting region is located at an opposite end of the slot from the cutout region.

4. The method of claim 1, wherein the tab portion is deflected by the panel as the bracket is slid through the open-ended slot; and wherein the bracket is slid through the open-ended slot until the tab portion snaps into the cutout portion.

5. The method of claim 1, further comprising removing the cable from the panel by:
   depressing the tab portion of the self-locking cable clamp arrangement; and
   sliding the bracket of the self-locking cable clamp arrangement out of the open-ended slot.

* * * * *